[12] United States Patent  
Bleidorn et al.

(10) Patent No.: US 11,134,431 B2  
(45) Date of Patent: Sep. 28, 2021

(54) SYSTEM AND METHOD TO DELIVER CONVERGED PUBLIC AND PRIVATE NETWORK SERVICES OVER DISPARATE ACCESS MEDIUMS WITHIN A SINGLE MARKET

(71) Applicant: Charter Communications Operating, LLC, St. Louis, MO (US)

(72) Inventors: Timothy C. Bleidorn, Colorado Springs, CO (US); Cheryl A. Warne, Lone Tree, CO (US); Shane B. Newberg, Aurora, CO (US); Christopher J. Teague, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/527,939

(22) Filed: Jul. 31, 2019

(65) Prior Publication Data

US 2021/0037449 A1 Feb. 4, 2021

(51) Int. Cl.
*H04W 48/08* (2009.01)
*H04L 29/08* (2006.01)
*H04W 88/16* (2009.01)
*H04W 84/12* (2009.01)

(52) U.S. Cl.
CPC ......... *H04W 48/08* (2013.01); *H04L 67/141* (2013.01); *H04W 84/12* (2013.01); *H04W 88/16* (2013.01)

(58) Field of Classification Search
CPC ..................................................... H04W 48/08
See application file for complete search history.

(56) References Cited

U.S. PATENT DOCUMENTS

| 9,864,859 | B2* | 1/2018 | Sood | G06F 9/45533 |
|---|---|---|---|---|
| 10,129,751 | B2* | 11/2018 | Singh | H04W 84/12 |
| 2009/0129301 | A1* | 5/2009 | Belimpasakis | H04W 28/18 370/310 |
| 2017/0034050 | A1* | 2/2017 | Sunavala | H04L 49/70 |
| 2017/0078216 | A1* | 3/2017 | Adolph | G06F 9/45558 |
| 2019/0230032 | A1* | 7/2019 | Landau | H04L 65/102 |
| 2020/0028700 | A1* | 1/2020 | Zaks | H04W 8/18 |
| 2020/0322182 | A1* | 10/2020 | Anshuman | H04L 12/4633 |

* cited by examiner

*Primary Examiner* — Jason E Mattis
(74) *Attorney, Agent, or Firm* — The Marbury Law Group, PLLC (57) ABSTRACT

Systems, methods, and devices for instantiating both a private network service (PrNS) gateway virtual network function (VNF) and a public network service (PuNS) gateway VNF for a user equipment (UE) device that is associated with a PrNS and communicatively attached a public WiFi network allow users to access the same set of feature-rich network services (including layer 2 services) when connected through a public hotspot WiFi network as when connected through a home or local area network WiFi network.

16 Claims, 10 Drawing Sheets

SYSTEM AND METHOD TO DELIVER CONVERGED PUBLIC AND PRIVATE NETWORK SERVICES OVER DISPARATE ACCESS MEDIUMS WITHIN A SINGLE MARKET

BACKGROUND

Wired and wireless communication technologies have seen dramatic improvements over the past several years. Due to these improvements, wireless devices, such as smartphone and tablets, have become ubiquitous personal accessories, providing users with access to Internet Protocol (IP) and data services anywhere, at any time. In addition, Internet Service Providers (ISPs) have been offering their customers a large number of complex and feature-rich private network services, such as speed caps, service pause and unpause, fine grained parental controls, built-in support for smart appliances, high speed access to devices (e.g., personal computers, printers, TVs, etc.) within the home or local area network, etc.

In conjunction with feature sets, ISPs have been deploying WiFi hotspots that allow their customers to use their wireless devices to access network services in public and semi-public places, such as in parks, shopping malls, coffee shops, etc while offloading service bandwidth from the ISP cellular networks. These hotspots form a second, public, WiFi network that is different and distinct from the local area network or WiFi network that is available inside the customer's premises.

However, due to various technical and security challenges, conventional solutions do not allow users to access the same set of feature-rich network services when connected through a public hotspot WiFi network as opposed to when the users are connected to their respective home or local area network (e.g., via the ISP's customer premise device, etc.) WiFi network. Therefore, it is desirable to provide users with new and improved solutions that allow users allow users to have the same feature-rich private network services and direct network access (at layer 2) to their devices in the home (such as a printer) while connected to the public hotspot WiFi network.

SUMMARY

The various aspects include methods of providing a user equipment (UE) device that is associated with a private network service (PrNS) and communicatively attached a public WiFi network with public or private network services, which may include instantiating both a PrNS gateway virtual network function (VNF) and a public network service (PuNS) gateway VNF for the UE device associated with the PrNS and communicatively attached the public WiFi network.

In an aspect, the methods may include creating a session on the PuNS gateway VNF for the UE device associated with the PrNS and communicatively attached the public WiFi network. In an aspect, the methods may include creating a session on the PrNS gateway VNF for the UE device associated with the PrNS and communicatively attached the public WiFi network.

In some aspects, the methods may include receiving a request to receive service from the UE device, generating and sending an access-request message to a PuNS authentication, authorization, and accounting (AAA) server, receiving an access-response message that includes policy information from the PuNS AAA server, and determining whether to create a session for the UE device associated with the PrNS and communicatively attached the public WiFi network on the PrNS gateway VNF or the PuNS gateway VNF based on the policy information included in the received access-response message.

The various aspects also include methods of providing a UE device that is communicatively attached a public WiFi network with public or private network services by receiving, in a processor of a public network service PuNS AAA server, an access request message from a network access server (the access request message including a request to receive a service on the UE device that is communicatively attached the public WiFi network), determining by the processor whether the UE device is associated with a private network service (PrNS), determining by the processor whether the UE device is flagged for convergence in response to determining that the UE device is associated with the PrNS, using by the processor a proxy function to request and receive policy information from a PrNS AAA server in response to determining that the UE device is flagged for convergence, and sending by the processor (via a modem, transceiver, communication circuitry, etc.) the received policy information to the network access server to cause the network access server to create a session on a PrNS gateway virtual network function (VNF) for the UE device communicatively attached the public WiFi network.

Further aspects may include a system that includes a UE device that is associated with a PrNS and communicatively attached a public WiFi network, a network access server (NAS), a PrNS AAA server, and a PuNS AAA server. The NAS may include a NAS processor that is configured with processor-executable software instructions to instantiate both a PrNS gateway VNF and a PuNS gateway VNF for the UE device that is associated with the PrNS and communicatively attached to the public WiFi network. The PuNS AAA server may include a PuNS AAA processor that is configured with processor-executable software instructions to receive an access request message from the NAS, the access request message including a request to receive a service on the UE device, determine whether the UE device is associated with the PrNS, determine whether the UE device is flagged for convergence in response to determining that the UE device is associated with the PrNS, use a proxy function to request and receive policy information from the PrNS AAA server in response to determining that the UE device is flagged for convergence, and send the received policy information to the NAS to cause the NAS to create a session on the PrNS gateway VNF for the UE device communicatively attached the public WiFi network.

Further aspects may include a computing device (e.g., UE device, NAS, PuNS AAA server, etc.) having a processor configured with processor-executable instructions to perform various operations corresponding to the methods discussed above. Further aspects may include a non-transitory processor-readable storage medium having stored thereon processor-executable instructions configured to cause a processor (e.g., NAS processor, PuNS AAA processor, etc.) to perform various operations corresponding to the method operations discussed above. Further aspects may include a computing device having various means for performing functions corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "service provider network" is used generically herein to refer to any network suitable for providing users with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable users to access communications service providers' services and distribute them around their house via a local area network (LAN), and similar electronic devices which include a programmable processor and memory and circuitry for providing the functionality described herein.

The terms "component," "system," "engine," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The Open Systems Interconnection model (OSI model) characterizes and standardizes the communication functions of a telecommunication or computing network, and supports interoperability of diverse communication systems with standard protocols. The OSI model partitions a communication system into layers, namely a physical layer, a data link layer, a network layer, a transport layer, a session layer, a presentation layer, and an application layer. The physical layer, or layer 1, is responsible for the transmission and reception of unstructured raw data between a device and a physical transmission medium, and converts the digital bits into electrical, radio, or optical signals. The data link layer, or layer 2, is the protocol layer that transfers data between adjacent network nodes in a wide area network (WAN) or between nodes on the same local area network (LAN)

segment. The network layer, or layer 3, is responsible for packet forwarding including routing through intermediate routers.

The terms "adjacency" or "layer adjacency" may be used in this application to refer to communications between two components at the same layer of the OSI model without converting packets or information to support a higher layer of abstraction. For example, the phrase "layer 2 adjacency" may be used to indicate that two components in a network may communicate using a data link layer protocol without converting the packets or information to support layer 3 devices or protocols. Achieving layer 2 adjacency means that the packets sent by a network component reach their destination directly, without traveling through a device that would modify the packet. Typically, layer 2 adjacency may only be achieved when both the sending and receiving components are included as part of the same subnet or in an area that is serviced by the same headend. This often means that the sending component must be included in the same market, city or geographical area as the receiving component.

Generally, a virtual private network (VPN) is a layer 3 (network layer) technology that extends a private network across a public network, and enables users to send and receive data across shared or public networks as if their computing devices were directly connected to the private network. A VPN may be created by establishing a virtual point-to-point connection through the use of dedicated circuits or with tunneling protocols over existing networks. VPNs commonly use Multiprotocol Label Switching (MPLS) labels to transport data.

Layer 2 VPNs are a type of VPN in which the communications occur between Provider Edge routers (PEs) that sit on the edge of the provider's network, next to the user's network. Some service provider networks that have an existing layer 2 network infrastructure (e.g., ATMs, Frame Relays, etc.) may choose to provide or utilize layer 2 VPNs over conventional layer 3 VPNs. However, existing layer 2 VPN solutions are cumbersome, inefficient, do not provide true layer 2 adjacency, and/or cannot be used to extend a private network across a public network at the data link layer for user devices or UEs.

The term "virtual network function (VNF)" may be used in this application to refer a component, system, or network element that is configured to use virtualization techniques to implement a network function. For example, a VNF may be a software implementation of a network function that may be deployed on virtualized infrastructure (e.g., compute, storage, and network) so that it may operate in a virtualized environment on commodity hardware.

Many users connect to the Internet via a customer premise equipment (CPE) component/device. A CPE device may include a cable modem, digital subscriber line modem, router, switch, firewall, packet filter, wireless access point, and/or a residential gateway that provide network connectivity to a private home or small office network. In particular, a CPE device may allow UE devices on the local area network (LAN) to connect to a service provider network, wide area network (WAN) and ultimately the Internet.

A virtual customer premises equipment (vCPE) is a network enhanced residential gateway architecture in which many of the functions and services of the CPE are offloaded to a broadband network gateway (BNG) in the service provider network. In this architecture, a private network service gateway (PrNS-G) VNF component or a public network service gateway (PuNS-G) VNF component provides may of the functions normally provided by a physical CPE in conventional systems that do not implement vCPE.

Conventional vCPE solutions support the use of either a PrNS-G VNF or a PuNS-G VNF for a user, subscriber, subscriber connection, or UE device (herein collectively UE device). For example, conventional vCPE solutions support the use of a PrNS-G VNF when a UE is attached to a CPE in a private LAN (e.g., a home network), and the use of a PuNS-G VNF when the UE is attached to a hotspot or public WiFi network. For these and other reasons, using conventional solutions, a UE device that is attached to a hotspot or public WiFi network cannot offer the user with the exact same network services (e.g., parental controls, etc.) and user experience as when the UE device is attached to a private or home network.

Unlike conventional solutions, the various embodiments disclosed herein include components (e.g., network access server, etc.) configured to instantiate both a PrNS-G VNF and a PuNS-G VNF for UE device that is attached to a hotspot or public WiFi network. Some embodiments may also include components configured to proxy to (or use proxies to communicate with) components associated with private network services. For example, in an embodiment, a public network service authentication, authorization, and accounting (PuNS-A) component may be configured to proxy to the private network authentication service to retrieve policy information from a private network service policy system (PrNS-PS), and instantiate a UE session on a PrNS-G VNF for a UE device that is attached to a hotspot or public WiFi network. This allows a UE device that is attached to a hotspot or public WiFi network to access and receive private network services (e.g., parental controls, app usages restrictions, etc.) while maintaining layer 2 adjacency. The UE device may directly access (at layer 2) other devices in a private LAN, such as a printer in the user's private home network, without the use of virtual private network (VPN) or other layer 3 solutions.

For all the above reasons, the various embodiments may improve the performance, security and/or functioning of the network and user devices. Additional improvements to the performance, security and functioning of the network and user devices will be evident from the disclosures herein.

Figure 1A:
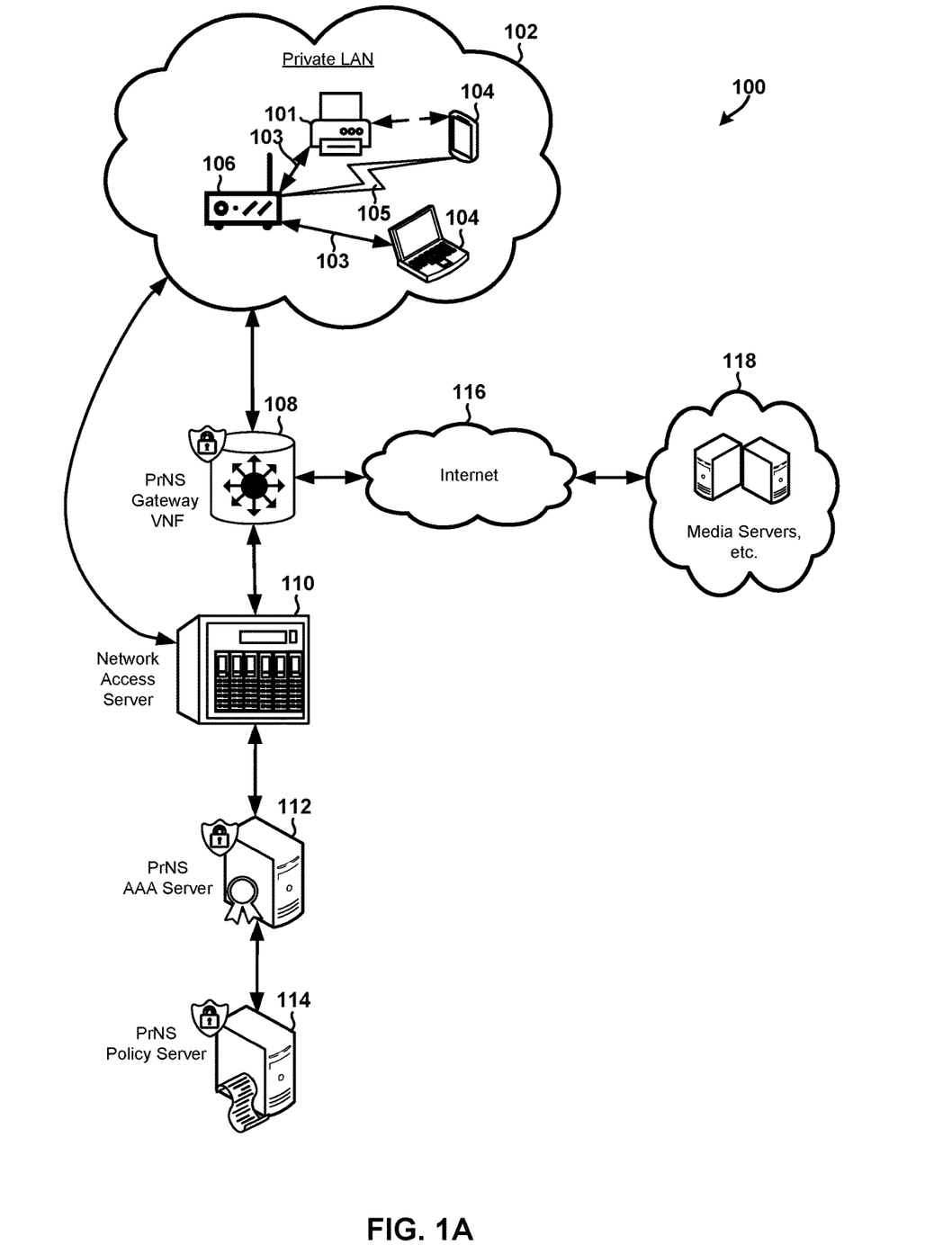
FIG. 1A is a block diagram illustrating components and communication links in an example network configured to deliver private network services (PrNS) that could benefit from the various embodiments.

FIG. 1A illustrates various components and communication links in network 100 that may be configured to deliver a private network services (PrNS). In the example illustrated in FIG. 1A, the network 100 includes a private LAN 102 that includes a printer 101 and other user equipment (UE) 104 devices coupled to a CPE 106 component/device via wired 103 and wireless 105 communication links. The network 100 also includes a PrNS gateway VNF 108, a network access server (NAS) 110, a PrNS authentication, authorization, and accounting (AAA) server 112, and a PrNS policy server 114.

The CPE 106 may include communication links to the NAS 110 and the PrNS gateway VNF 108, which may be communicatively coupled to one or more network servers 118 (e.g., media servers, content delivery servers, webservers, application functions, etc.) via the Internet 116. The PrNS gateway VNF 108 may also be communicatively coupled to the NAS 110. The NAS 110, PrNS AAA server 112 and the PrNS policy server 114 may be configured to utilize the RADIUS protocol to communicate messages and information (e.g., policy parameters, AAA information, etc.).

The CPE 106 may broadcast a private service set identifier (SSID) that allows the UE 104 devices to identify the private LAN 102, establish wireless communication links to the private LAN 102, and to ultimately receive or access the private network services.

The PrNS gateway VNF 108 may be configured to provide, maintain or manage many of the functions that, in conventional solutions, are provided by a physical CPE (e.g., CPE 106) located at the user premise site. The PrNS gateway VNF 108 may logically terminate the private LAN 102, and have visibility into the Media Access Control (MAC) addresses of all the devices included in the private LAN 102 and/or which are otherwise connected to receive private network services. The PrNS gateway VNF 108 may responsible for managing and delivering feature-rich PrNSs, such as speed caps, service pause and unpause, fine grained parental controls, etc. The PrNS gateway VNF 108 may be instantiated by the NAS 110.

The NAS 110 may be configured to perform various AAA operations on behalf of a user, subscriber, subscriber connection, or UE 104 device (herein collectively UE 104 device). For example, the NAS 110 may receive a request from a UE 104 device included in the private LAN 102 to receive service. The NAS 110 may generate and send an access-request message to the PrNS AAA server 112. The NAS 110 may receive an access-response message that includes policy or AAA information from the PrNS AAA server 112, and use the information included in the access-response message to determine whether a UE 104 device is authorized to receive the requested service. The NAS 110 may instantiate an instance of the PrNS gateway VNF 108 for the UE 104 device in response to determining that the UE 104 device is authorized to receive the requested service.

The PrNS AAA server 112 may be configured to authenticate access-requests from the NAS 110, pull appropriate subscriber policies from the PrNS policy server 114, interpret policy responses on behalf of the NAS 110, and return an appropriate policy to the NAS 110. For example, the PrNS AAA server 112 may receive the access-request message from the NAS 110, query the PrNS policy server 114 and/or other servers in the service provider network to receive the appropriate policy (or charging, subscriber, etc.) information, and use the received information to determine whether the UE 102 should be granted access to a requested service. The PrNS AAA server 112 may generate and send an access-response message that includes policy and/or AAA information to the NAS 110.

The PrNS policy server 114 may be a policy management system that is responsible for identifying or determining various subscriber policies, such as policy rules that control the bandwidth, the quality of service (QoS), and other characteristics of the network connections and communications of UE 104 devices. For example, the PrNS policy server 114 may maintain policy information for every UE 104 device that is included as part of the network 100 or otherwise connected to receive private network services. The PrNS policy server 114 may receive a request message (e.g., a request for attaching a subscriber session associated with UE 104 device, etc.) from the PrNS AAA server 112, use the information included in the received request message to identify the policy information/parameters that are relevant to a subscriber or UE 104 device, generate a response message that includes the identified policy information/parameters, and send the generated response message to the PrNS AAA server 112.

When the NAS 110 determines that a UE 104 device is authorized to receive a requested service, and instantiates an instance of the PrNS gateway VNF 108 for the UE 104 device, the private LAN 102 may be extended at layer 2 (data link layer) into the service provider network and anchored in the PrNS VNF 108. The UE 104 device may have layer 2 adjacency to the home printer 101, may be able to communicate with other devices connected to the private LAN 102, and may access Internet 116 resources. That is, unlike conventional systems that require layer 3 (e.g., IP, etc.) communications, the network 100 illustrated in FIG. 1A allows the UE 104 device to communicate with the home printer 101, and receive private network services, via layer 2 protocols and communications.

Figure 1B:
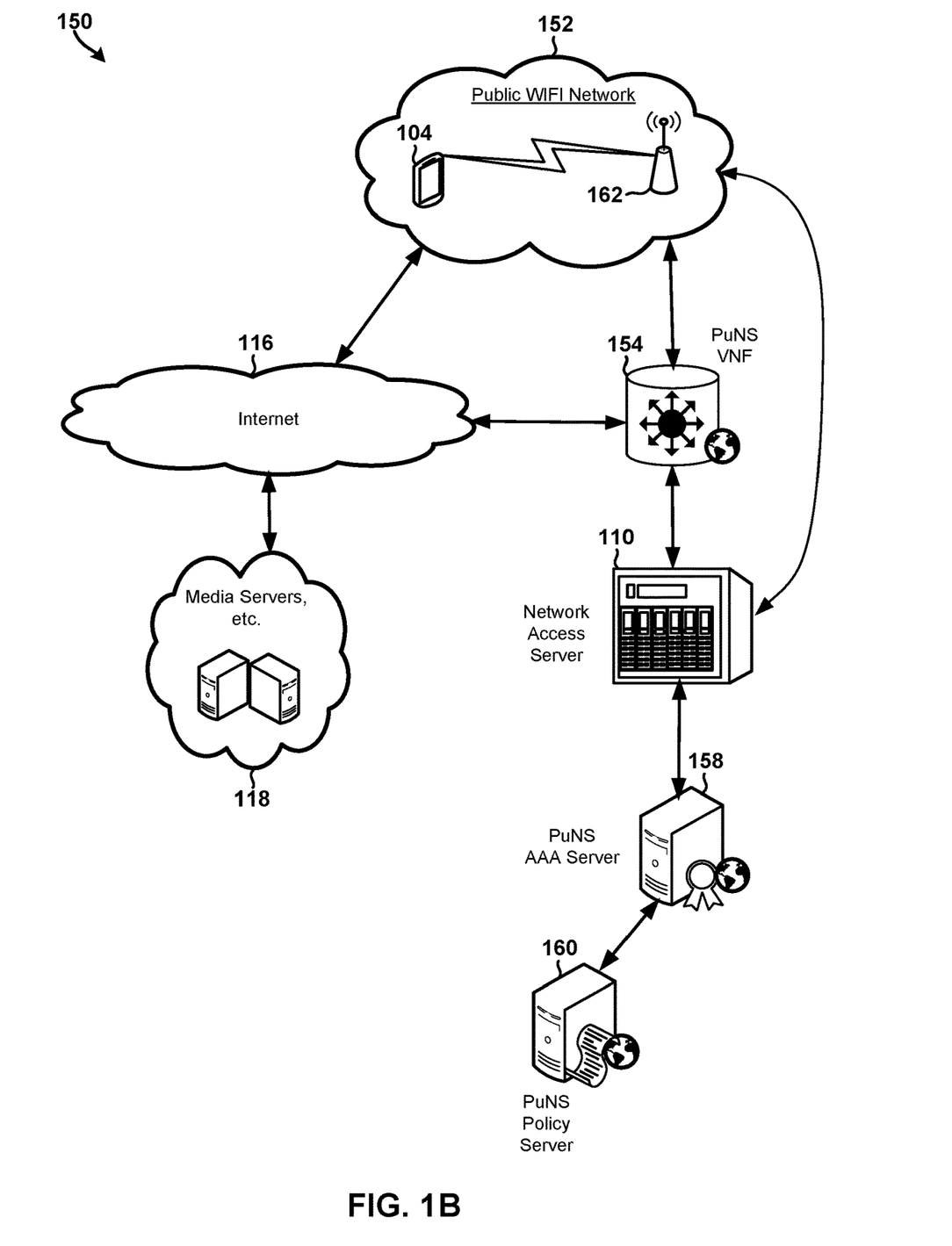
FIG. 1B is a block diagram illustrating components and communication links in an example network configured to deliver a public network service (PuNS) that could benefit from the various embodiments.

FIG. 1B illustrates various components and communication links in an example network 150 that may be configured to deliver a public network service (PuNS) in accordance with some embodiments. In the example illustrated in FIG. 1B, the network 150 includes a public WiFi network 152, a PuNS gateway VNF 154, a NAS 110, a PuNS AAA server 158, and a PuNS policy server 160. The public WiFi network 152 includes one or more UE 104 devices connected to a wireless router or hotspot 162 component via wired or wireless communication links.

The wireless router or hotspot 162 may broadcast a public SSID that allows the UE 104 devices to identify and connect to the public WiFi network 150, and ultimately receive public network services on the UE 104 devices. Each UE 104 attached to the public WiFi network 152 may be isolated from all other UEs 104 in the public WiFi network 152. Unlike devices attached to the private LAN 102 discussed above with reference to FIG. 1A, a UE 104 attached to the public WiFi network 150 may not be able to readily access or directly communicate with the other devices included in the public WiFi network 150 (e.g., via layer 2 communications, etc.).

The PuNS gateway VNF 154 may serve as the gateway for the public UEs 104 attached to the public WiFi network 152, and may be configured to perform or provide a sub-set of the operations and features of the PrNS gateway VNF 108 (discussed above with reference to FIG. 1A). For example, layer 3 tunneling technology may be used to deliver network traffic and communications from the public UEs 104 to network components at layer 2, providing MAC address visibility to the PuNS gateway VNF 154.

The PuNS AAA server 158 and PuNS policy server 160 may be configured to perform the same or similar operations as the PrNS AAA server 112 and PrNS policy server 114 discussed with reference to FIG. 1A, except with different rules or configurations to account for the differences between the public 152 and private network 102 services.

Figure 2:
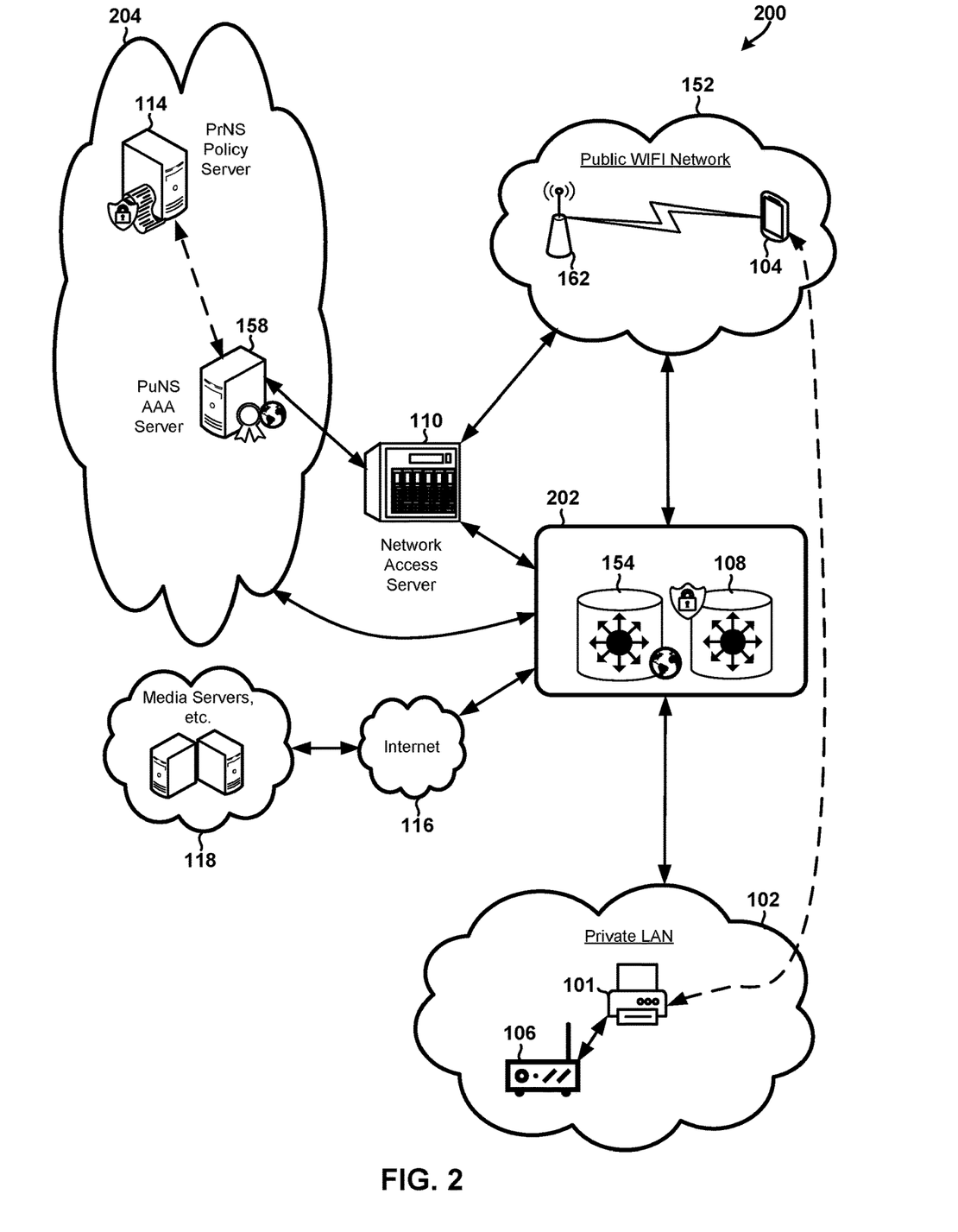
FIG. 2 is a block diagram illustrating components and communication links in a unified identify and policy system configured to deliver private and public services in accordance with the various embodiments.

FIG. 2 illustrates components and communication links in a unified identify and policy system 200 that could be configured to deliver private network services to a subscriber or UE device attached to public WiFi network in accordance with the embodiments. In the example illustrated in FIG. 2, the system 200 includes a NAS 110 that is configured to generate or instantiate a combined gateway 202 that includes both a PrNS gateway VNF 108 and a PuNS gateway VNF 154. The NAS 110 may also be configured to communicate with a PuNS AAA server 158. The PuNS AAA server 158 may be logically grouped into a backend system 204 that includes the illustrated a PrNS policy server 114, PuNS AAA server 158, and various other private and public backend components (e.g., PrNS AAA server 112, PuNS policy server 160, etc.). The components grouped into the backend system 204 may communicate with one another via direct or indirect communication links or proxies.

Figure 3:
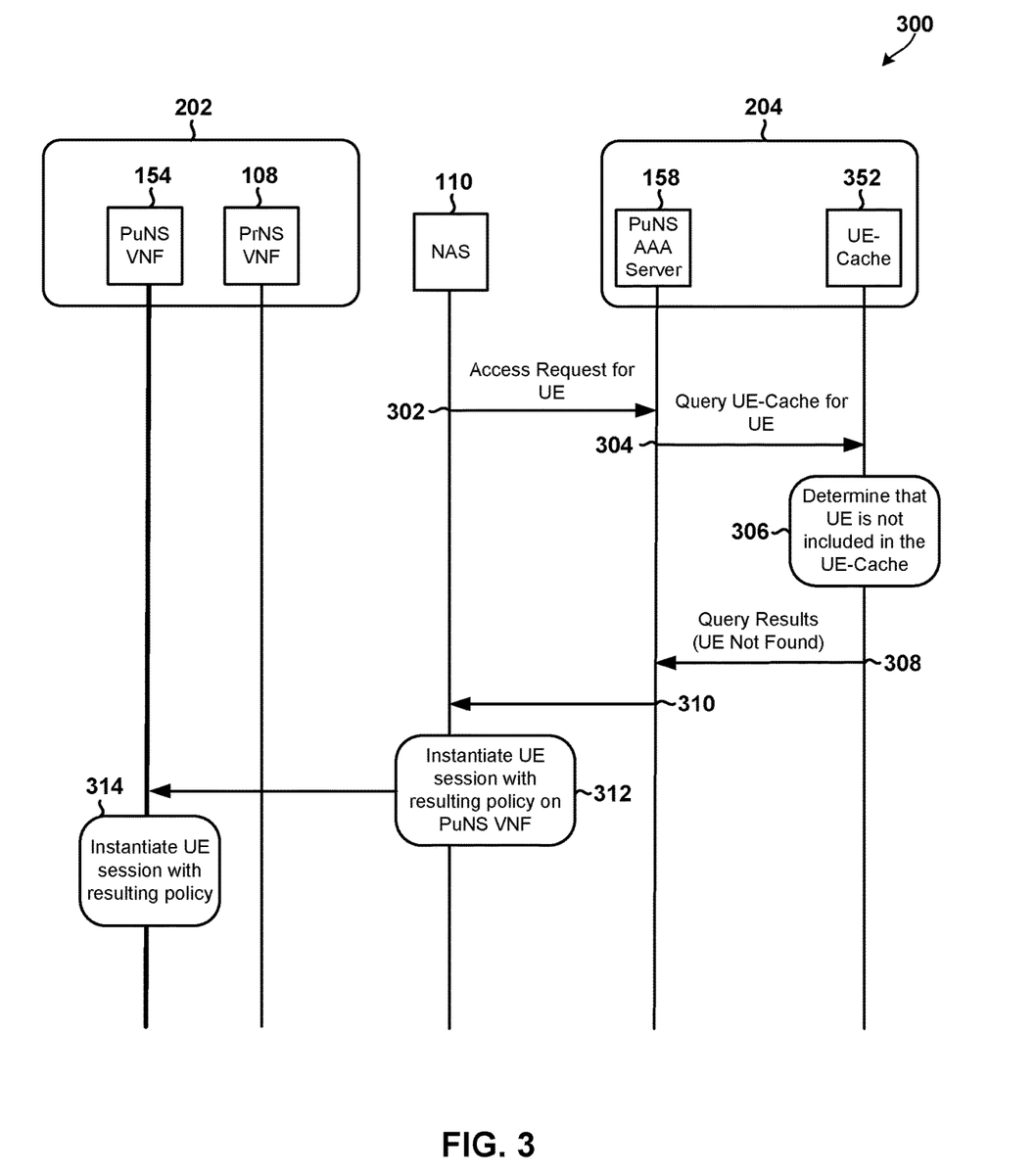
FIGS. 3 through 5 are activity diagrams illustrating operations and interactions between components in a unified identify and policy system configured to deliver private and public services in accordance with the various embodiments.
Figure 4:
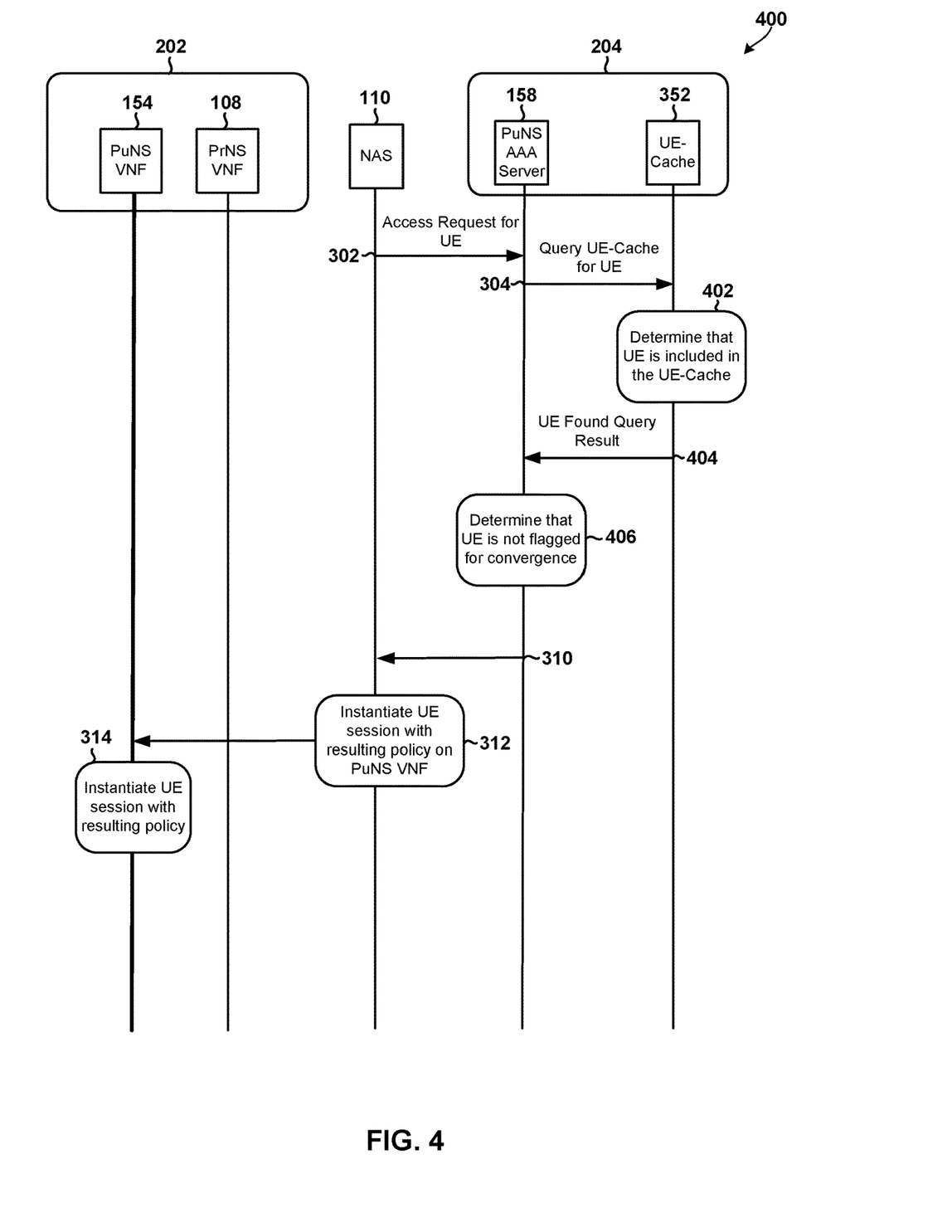
Figure 5:
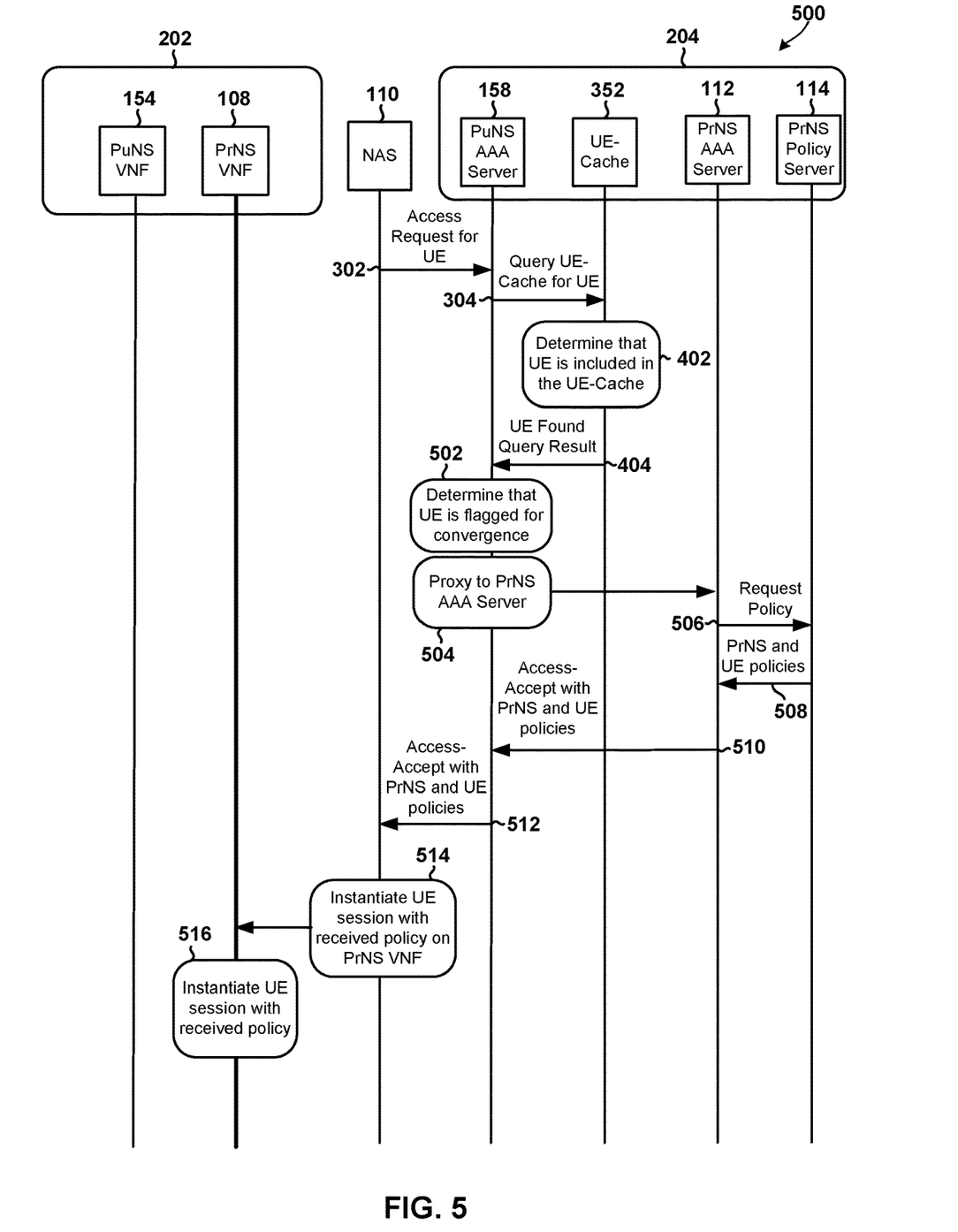

FIGS. 3-5 illustrate methods 300, 400, 500 that may be performed by the components in the unified identify and policy system 200 to determine the VNF (e.g., PuNS VNF 154 or PrNS VNF 108) on which the UE session should be instantiated and intelligently determine to policies that should be applied for a UE session in accordance with the embodiments. Methods 300, 400, 500 may be performed by one or more processors that are included in, or associated with, one or more computing systems that implement all or portions of the combined gateway 202 and backend system 204.

In particular, FIG. 3 illustrates a method 300 that could be performed for a UE device or user that does not have a PrNS subscription or the UE device was not selected to receive converged services. FIG. 4 illustrates a method 400 that could be performed for a UE device or user that has a PrNS subscription but has not elected to receive converged services. FIG. 5 illustrates a method 500 that could be performed for a UE device or user that has a PrNS subscription and has elected to receive converged services.

With reference to FIG. 3, a processor associated with the NAS 110 component may receive an access request from a UE device 104. The access request from the UE device 104 may be received through a public WiFi network 152. In operation 302 and in response to receiving the access request, the processor associated with the NAS 110 component may send an access request message for the UE device 104 to the PuNS AAA server 158. In operation 304, the PuNS AAA server 158 may determine whether the access requesting UE device 104 has a PrNS subscription, which may be accomplished by querying a UE-Cache 352 (or UE Identifier Cache, MAC cache, etc.) to determine whether the access requesting UE device 104 is included in a device repository, or a list of devices or subscribers. The access requesting UE device 104 may not be included the list of devices/subscribers for a variety of reasons, such as due to first time device usage, new device purchases, the device being transferred to a new user, a database malfunction that causes cache loss, etc. Also, the device may not be present in the list of devices/subscribers because it is the first time the device has been attached to the network, and the device repository does not have any information on it.

In some embodiments, the UE-Cache 352 may store a combination of user profiles and device profiles. In some embodiments, the UE-Cache 352 may store a data collection indexed by a UE device identifier that includes policy data and/or an account identifier. In some embodiments, the UE-Cache 352 may store subscriber profile policies, MAC addresses of devices, policies to apply to the MAC addresses, etc. In some embodiment, the UE-Cache 352 may store MAC addresses under multiple subscriber profiles with different policies. In some embodiments, to ensure the current policy is applied, all private session information may be proxied up to a private policy system.

In some embodiments, all or portions of the UE-Cache 352 may be implemented as a standalone component, included the backend system 204, and/or included or implemented as part of another component (e.g., the PuNS AAA server 158, a subscriber repository, etc.) in the backend system 204.

In operation block 306, a processor associated with the UE-Cache 352 may determine that the user does not have a PrNS subscription and/or that the UE is not included in the list stored or maintained by the UE-Cache 352. The UE-Cache 352 may store MAC addresses of end devices and specific customized policy information pertaining to how the device should be treated, what customer the device belongs to, etc.

In operation 308, the UE-Cache 352 may send the query results (indicating that the access requesting UE device 104 was not found in the list or the UE device was not selected to receive converged services) to the PuNS AAA server 158. In operation 310, the PuNS AAA server 158 may use the received query results to determine that the UE device should not use a PrNS session, determine that a conventional PuNS policy should be followed for the access requesting UE device 104, generate an access accept message that includes information for instantiating a PuNS session, and send the access accept message to the NAS 110. In operation 312, the NAS 110 component may receive the access accept message from the PuNS AAA server 158, determine that a UE session should be instantiated on the PuNS VNF 154, and perform various operations to cause the PuNS VNF to instantiate a UE session with the resulting policy. In operation 314, a processor associated with the PuNS VNF 154 may instantiate the UE session with the resulting policy. The access requesting UE device 104 may then use the UE session to receive public network services. In such an embodiment method where the access requesting UE device 104 is determined to not be included in the UE cache 352 or not selected to received converged services, the access requesting UE device 104 would not receive the rich feature set offered to the access requesting UE device 104 when it is connected to the associated private network. Instead, the access requesting UE device 104 is provided with services according to the public WIFi network policy logic.

FIG. 4 illustrates a method 400 that could be performed for a UE device 104 that is registered to receive private and public network services, is not flagged for convergence. As above, a processor associated with the NAS 110 component may receive an access request from a UE device 104. The access request from the access requesting UE device 104 may be received through a public WiFi network 152. In operations 302 and 304, the NAS 110 and PuNS AAA server 158 may perform the operations discussed above with reference to FIG. 3. In operation 402, a processor associated with the UE-Cache 352 may determine that the access requesting UE device 104 is included in the list of eligible UEs. In operation 404, the UE-Cache 352 may send the query results (indicating that the access requesting UE device 104 was found in the list) to the PuNS AAA server 158.

In operation 406, the PuNS AAA server 158 may determine that the access requesting UE device 104 is not flagged for convergence. In some embodiments, the flag (e.g., convergence flag) may be stored in cache memory (e.g., UE-Cache 352) and associated with the subscriber account/device. In some embodiments, the PuNS AAA server 158 may be configured to check to determine whether the access requesting UE device 104 is flagged for convergence based on the information included in the received query message. In some embodiments, the PuNS AAA server 158 may be configured to determine that the access requesting UE device 104 is not flagged for convergence based on the information included in the received query message.

In operation 408, the PuNS AAA server 158 may determine that there is no refresh policy associated with the access requesting UE device 104 or subscriber. In some embodiments, the PuNS AAA server 158 may be configured to determine whether there is a refresh policy associated with the access requesting UE device 104 or subscriber in operation 408 in response to determining that the access requesting UE device 104 is not flagged for convergence.

In operations 310 through 314, the PuNS AAA server 158 may determine that the UE device should not use a PrNS session, the NAS 110 component may determine that a UE session should be instantiated on the PuNS VNF 154, and perform various operations to cause the PuNS VNF to instantiate a UE session with the resulting policy, and a processor associated with the PuNS VNF 154 may instantiate the UE session with the resulting policy. The access requesting UE device 104 may then use the UE session to receive public network services.

FIG. 5 illustrates a method 500 performed by the components in the system 200 for an access requesting UE device 104 (e.g., UE 104 illustrated in FIGS. 1A-2) that is flagged for convergence in accordance with the embodiments. In operations 302 and 304, the NAS 110 and PuNS AAA server 158 may perform the operations discussed above with reference to FIG. 3. In operations 402 and 404, the UE-Cache 352 and PuNS AAA server may perform the operations discussed above with reference to FIG. 4.

In operation block 502, the PuNS AAA server 158 may determine that the UE is flagged for convergence. In some embodiments, the PuNS AAA server 158 may be configured to check to determine whether the access requesting UE device 104 is flagged for convergence based on the information included in the received query message in operation 404. In response to determining that the access requesting UE device 104 is flagged for convergence, in operation block 504, the PuNS AAA server 158 may proxy the request to the PrNS AAA Server 112 to request policy information for the session.

In operation 506, the PrNS AAA Server 112 may generate and send a policy request message to the PrNS Policy Server 114. In operation 508, the PrNS Policy Server 114 may use the information included in the received policy request message to identify the relevant PrNS and UE policies, generate a policy response message that includes the identified PrNS and UE policies, and send the generated policy response message to the PrNS AAA Server 112. In operation 510, the PrNS AAA Server 112 may generate an access accept message based on the PrNS and UE policy information included in the received policy response message, and send the generated access accept message to the PuNS AAA server 158. In operation 512, the PuNS AAA server 158 may receive and forward the access accept message to the NAS 110.

In operation 514, the NAS 110 component may receive the access accept message from the PuNS AAA server 158, determine that the received access accept message includes policy information, determine that a UE session with the received policy should be instantiated on the PrNS VNF 108, and perform various operations to cause the PrNS VNF 108 to instantiate a UE session based on the received policy information. In operation 516, a processor associated with the PrNS VNF 108 may instantiate the UE session with the received policy information, and the access requesting UE device 104 may commence receiving private network services despite requesting access through a hotspot or public WiFi network 152.

Figure 6:
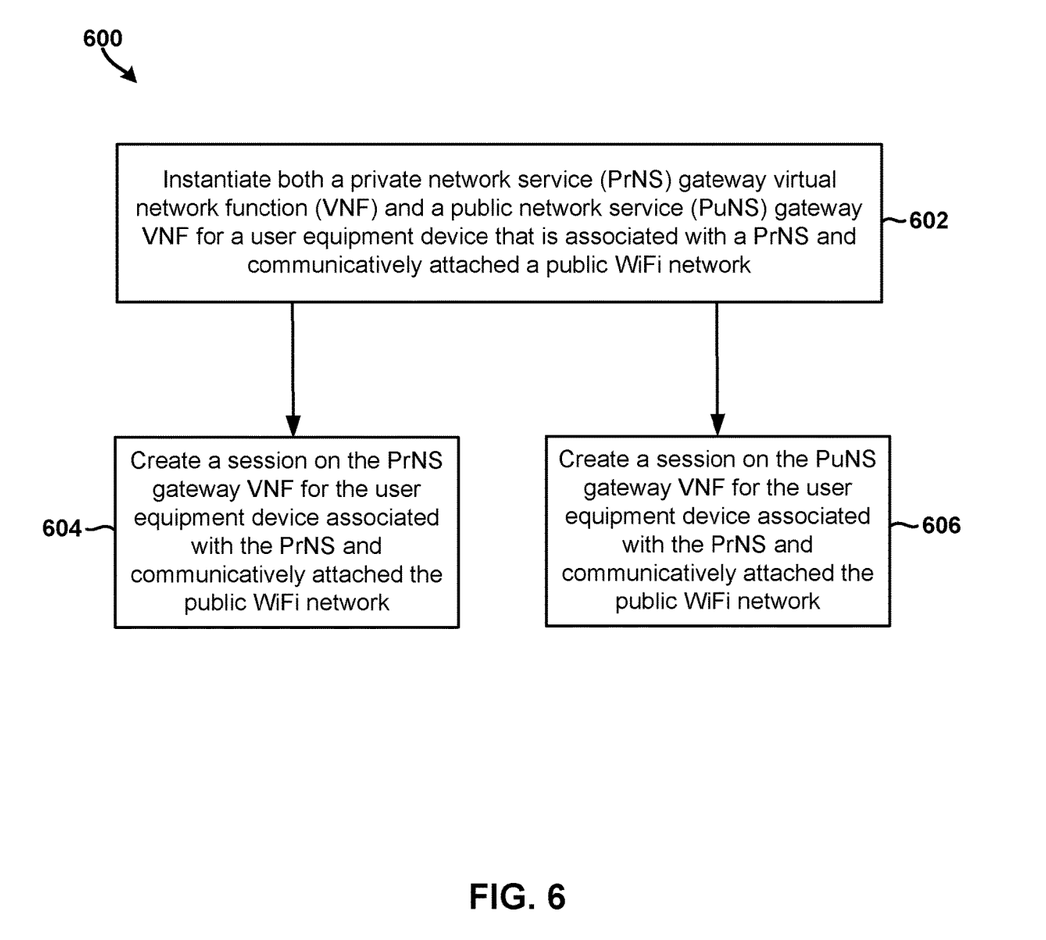
FIGS. 6 through 8 are process flow diagrams illustrating methods that could be performed in the unified identify and policy system to instantiate a session and provide a user equipment device with public or private network services in accordance with various embodiments.

FIG. 6 illustrates a method 600 performed by the components in the system 200 for an access-requesting UE device 104 (e.g., UE 104 illustrated in FIGS. 1A-2) to provide the access-requesting UE device 104 with public or private network services in accordance with an embodiment. Method 600 may be performed by one or more processors of one or more components of system 200.

In block 602, a device processor may instantiate both a private network service (PrNS) gateway virtual network function (VNF) and a public network service (PuNS) gateway VNF for a user equipment device that is associated with a PrNS and communicatively attached a public WiFi network. In optional block 604, the device processor may create a session on the PrNS gateway VNF for the user equipment device associated with the PrNS and communicatively attached the public WiFi network. Alternatively or in addition to block 604, the device processor may create a session on the PuNS gateway VNF for the user equipment device associated with the PrNS and communicatively attached the public WiFi network.

Figure 7:
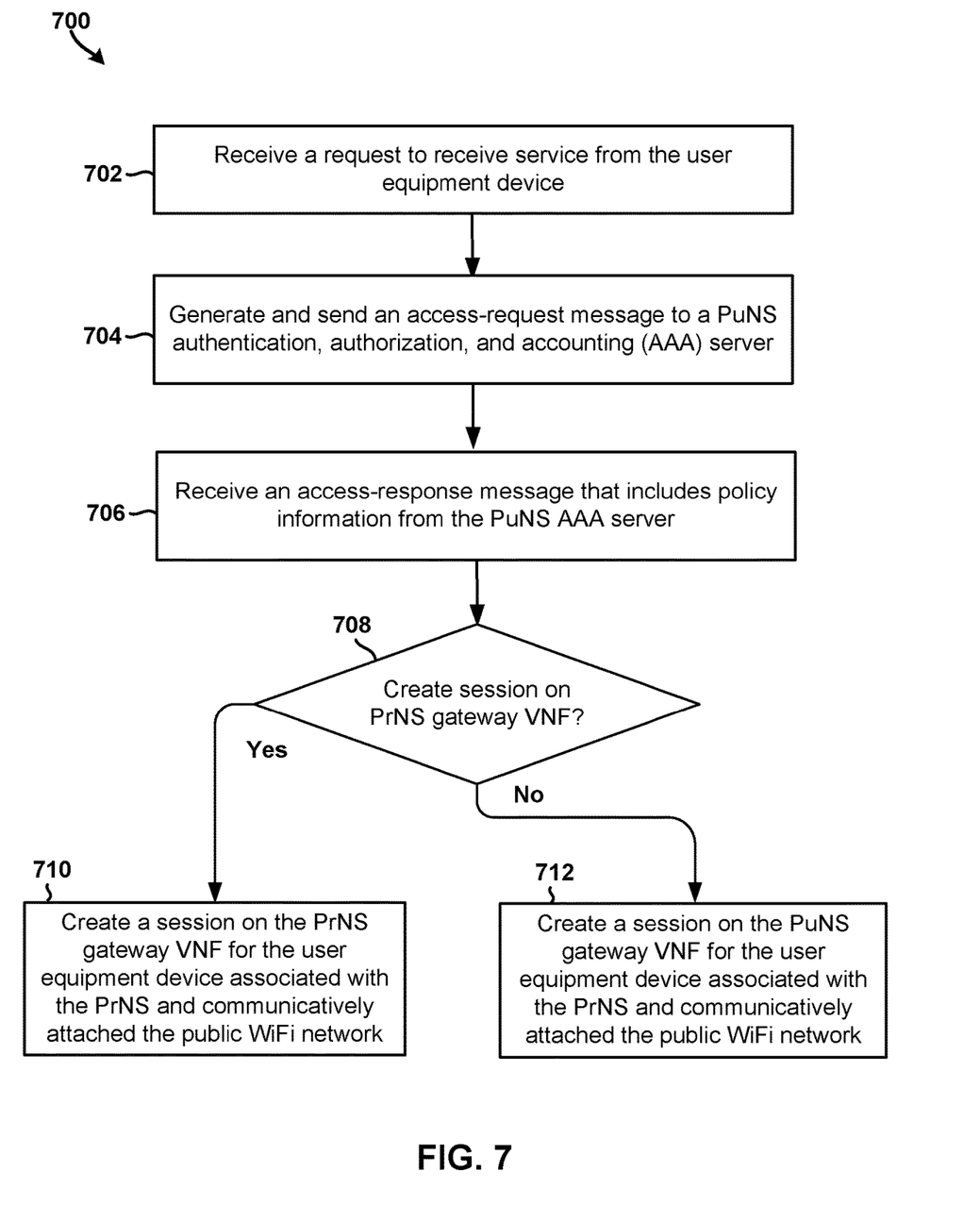

FIG. 7 illustrates a method 700 performed by the components in the system 200 for an access-requesting UE device 104 (e.g., UE 104 illustrated in FIGS. 1A-2) to provide the access-requesting UE device 104 with public or private network services in accordance with another embodiment. Method 700 may be performed by one or more processors of one or more components (e.g., network access server 110, etc.) of system 200.

In block 702, a device processor may receive a request to receive service from a user equipment device (e.g., access-requesting UE device 104, etc.). In block 704, the device processor may generate and send an access-request message to a PuNS AAA server. In block 706, the device processor may receive an access-response message that includes policy information from the PuNS AAA server. In determination block 708, the device processor may determine whether to create a session for the user equipment device associated with the PrNS and communicatively attached the public WiFi network on the PrNS gateway VNF or the PuNS gateway VNF based on the policy information included in the received access-response message. In response to determining that the session for the user equipment device should be created on the PrNS gateway VNF (i.e., determination block 708="Yes"), the device processor may create a session on the PrNS gateway VNF for the user equipment device associated with the PrNS and communicatively attached the public WiFi network in block 710. In response to determining that the session for the user equipment device should not be created on the PrNS gateway VNF (i.e., determination block 708="No"), the device processor may create a session on the PuNS gateway VNF for the user equipment device associated with the PrNS and communicatively attached the public WiFi network in block 712.

Figure 8:
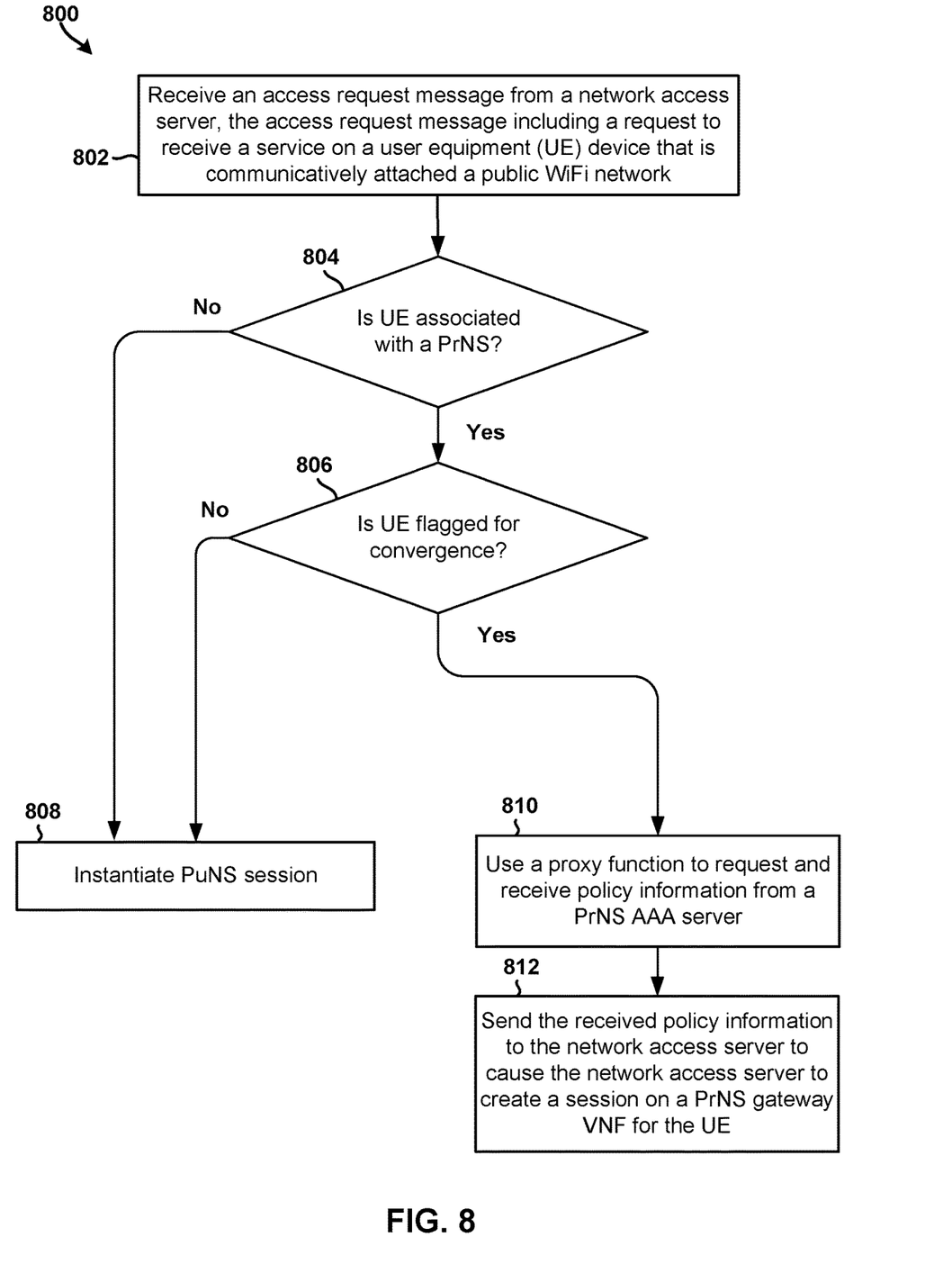

FIG. 8 illustrates a method 800 performed by the components in the system 200 for an access-requesting UE device 104 (e.g., UE 104 illustrated in FIGS. 1A-2) to provide the access-requesting UE device 104 with public or private network services in accordance with an embodiment. Method 800 may be performed by one or more processors of one or more components (e.g., backend system 204, PuNS AAA server 158, etc.) of system 200.

In block 802, a device processor may receive an access request message from a network access server, the access request message including a request to receive a service on a user equipment (UE) device that is communicatively attached a public WiFi network. In determination block 804, the device processor may determine whether the UE is associated with a PrNS. In response to determining that the UE is associated with a PrNS (i.e., determination block 804="Yes"), the device processor may determine whether the UE is flagged for convergence in response to determining that the UE is associated with the PrNS in determination block 806.

In response to determining that the UE is not associated with a PrNS (i.e., determination block 804="No") or that the UE is not flagged for convergence (i.e., determination block 806="No"), the device processor may instantiate a conventional instantiate PuNS session in block 808.

In response to determining that the UE is flagged for convergence (i.e., determination block 806="Yes"), the device processor may use a proxy function to request and receive policy information from a PrNS AAA server in block 810. In block 812, the device processor may send the received policy information to the network access server to cause the network access server to create a session on a PrNS gateway virtual network function (VNF) for the UE communicatively attached the public WiFi network.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 400, 500, 600, 700, and 800 may be substituted for or combined with one or more operations of the methods 300, 400, 500, 600, 700, and 800 and vice versa.

Figure 9:
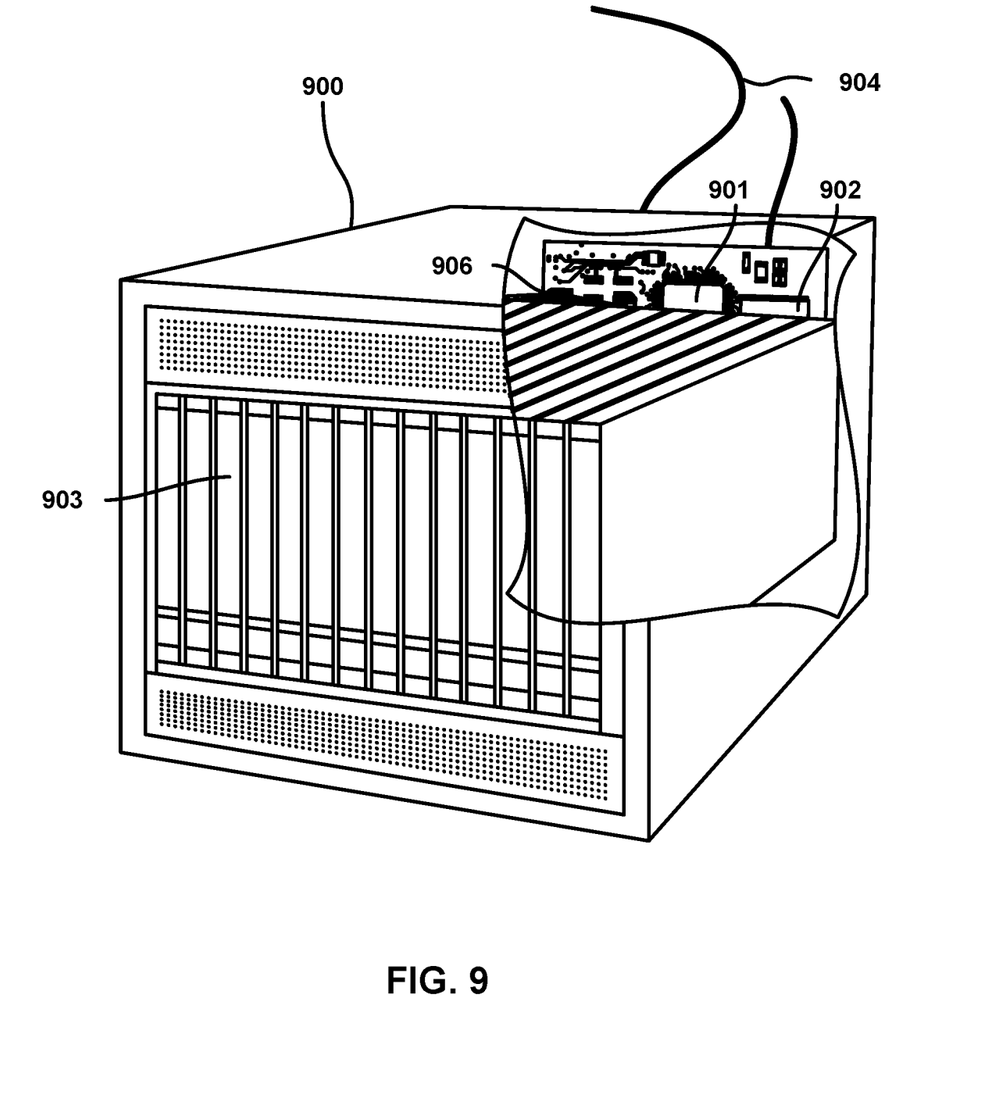
FIG. 9 is a component diagram of an example server suitable for implementing the various embodiments.

Various embodiments (including, but not limited to, embodiments discussed above with reference to FIGS. 1A-8) may be implemented on any of a variety of commercially available computing devices, such as the server computing device 900 illustrated in FIG. 9. Such a server device 900 may include a processor 901 coupled to volatile memory 902 and a large capacity nonvolatile memory, such as a disk drive 903. The server device 900 may also include a floppy disc drive, USB, compact disc (CD) or DVD disc drive coupled to the processor 901. The server device 900 may also include network access ports 906 coupled to the processor 901 for establishing data connections with a network connection circuit 904 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A network access server, comprising:
a processor configured with processor-executable software instructions to:
instantiate both a private network service gateway (PrNS-G) virtual network function (VNF) and a public network service gateway (PuNS-G) VNF for a user equipment (UE) device that is associated with a private network service (PrNS) and communicatively attached to a public WiFi network; and
determine whether to create a session for the UE device associated with the PrNS and communicatively attached to the public WiFi network on the PrNS-G VNF or the PuNS-G VNF.

2. The network access server of claim 1, wherein the processor is configured with processor-executable software instructions to:
create the session on the PuNS-G VNF for the UE device associated with the PrNS and communicatively attached to the public WiFi network.

3. The network access server of claim 1, wherein the processor is configured with processor-executable software instructions to:
create the session on the PrNS-G VNF for the UE device associated with the PrNS and communicatively attached to the public WiFi network.

4. The network access server of claim 1, wherein the processor is configured with processor-executable software instructions to:
receive a request to receive service from the UE device;
generate and send an access-request message to a public network service authentication, authorization, and accounting (PuNS-AAA) server;
receive an access-response message that includes policy information from the PuNS-AAA server; and
determine whether to create the session for the UE device associated with the PrNS and communicatively attached to the public WiFi network on the PrNS-G VNF or the PuNS-G VNF by determining whether to create the session for the UE device associated with the PrNS and communicatively attached to the public WiFi network on the PrNS-G VNF or the PuNS-G VNF based on the policy information included in the received access-response message.

5. A non-transitory computer readable storage medium having stored thereon processor-executable software instructions configured to cause a processor in a network access server to perform operations comprising:
instantiating both a private network service gateway (PrNS-G) virtual network function (VNF) and a public network service gateway (PuNS-G) VNF for a user equipment (UE) device that is associated with a private network service (PrNS) and communicatively attached to a public WiFi network; and
determining whether to create a session for the UE device associated with the PrNS and communicatively attached to the public WiFi network on the PrNS-G VNF or the PuNS-G VNF.

6. The non-transitory computer readable storage medium of claim 5, wherein the stored processor-executable software instructions are configured to cause the processor to perform operations further comprising:
creating the session on the PuNS-G VNF for the UE device associated with the PrNS and communicatively attached to the public WiFi network.

7. The non-transitory computer readable storage medium of claim 5, wherein the stored processor-executable software instructions are configured to cause the processor to perform operations further comprising:
creating the session on the PrNS-G VNF for the UE device associated with the PrNS and communicatively attached to the public WiFi network.

8. The non-transitory computer readable storage medium of claim 5, wherein:
the stored processor-executable software instructions are configured to cause the processor to perform operations further comprising:
receiving a request to receive service from the UE device;
generating and send an access-request message to a public network service authentication, authorization, and accounting (PuNS-AAA) server; and
receiving an access-response message that includes policy information from the PuNS-AAA server; and
the stored processor-executable software instructions are configured to cause the processor to perform operations such that determining whether to create the session for the UE device associated with the PrNS and communicatively attached to the public WiFi network on the PrNS-G VNF or the PuNS-G VNF comprises determining whether to create the session for the UE device associated with the PrNS and communicatively attached to the public WiFi network on the PrNS-G VNF or the PuNS-G VNF based on the policy information included in the received access-response message.

9. A network access server, comprising:
means for instantiating both a private network service gateway (PrNS-G) virtual network function (VNF) and for a user equipment (UE) device that is associated with a private network service (PrNS) and communicatively attached to a public WiFi network; and
means for determining whether to create a session for the UE device associated with the PrNS and communicatively attached to the public WiFi network on the PrNS-G VNF or the PuNS-G VNF.

10. The network access server of claim 9, further comprising:
means for creating the session on a public network service gateway (PuNS-G) VNF for the UE device associated with the PrNS and communicatively attached to the public WiFi network.

11. The network access server of claim 9, further comprising:
means for creating the session on the PrNS-G VNF for the UE device associated with the PrNS and communicatively attached to the public WiFi network.

12. The network access server of claim 9, further comprising:
means for receiving a request to receive service from the UE device;

means for generating and send an access-request message to a public network service authentication, authorization, and accounting (PuNS-AAA) server; and means for receiving an access-response message that includes policy information from the PuNS-AAA server, wherein means for determining whether to create the session for the UE device associated with the PrNS and communicatively attached to the public WiFi network on the PrNS-G VNF or the PuNS-G VNF comprises means for determining whether to create the session for the UE device associated with the PrNS and communicatively attached to the public WiFi network on the PrNS-G VNF or the PuNS-G VNF based on the policy information included in the received access-response message.

13. A method of providing a user equipment (UE) device that is associated with a private network service (PrNS) and communicatively attached to a public WiFi network with public or private network services, comprising:

instantiating both a private network service gateway (PrNS-G) virtual network function (VNF) and a public network service gateway (PuNS-G) VNF for the UE device associated with the PrNS and communicatively attached to the public WiFi network; and determining whether to create a session for the UE device associated with the PrNS and communicatively attached to the public WiFi network on the PrNS-G VNF or the PuNS-G VNF.

14. The method of claim 13, further comprising:

creating the session on the PuNS-G VNF for the UE device associated with the PrNS and communicatively attached to the public WiFi network.

15. The method of claim 13, further comprising:

creating the session on the PrNS-G VNF for the UE device associated with the PrNS and communicatively attached to the public WiFi network.

16. The method of claim 13, further comprising:

receiving a request to receive service from the UE device;

generating and send an access-request message to a public network service authentication, authorization, and accounting (PuNS-AAA) server; and receiving an access-response message that includes policy information from the PuNS-AAA server, wherein determining whether to create the session for the UE device associated with the PrNS and communicatively attached to the public WiFi network on the PrNS-G VNF or the PuNS-G VNF comprises determining whether to create the session for the UE device associated with the PrNS and communicatively attached to the public WiFi network on the PrNS-G VNF or the PuNS-G VNF based on the policy information included in the received access-response message.

* * * * *